United States Patent
Lindström et al.

(10) Patent No.: US 10,099,676 B2
(45) Date of Patent: *Oct. 16, 2018

(54) TRACTION SYSTEM FOR A VEHICLE

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: SCANIA CV AB, Södertälje (SE)

( * ) Notice: Subject to any disclaimer, the term of this patent is extended or adjusted under 35 U.S.C. 154(b) by 152 days.

This patent is subject to a terminal disclaimer.

(21) Appl. No.: 15/106,787

(22) PCT Filed: Dec. 23, 2014

(86) PCT No.: PCT/SE2014/051573
§ 371 (c)(1),
(2) Date: Jun. 20, 2016

(87) PCT Pub. No.: WO2015/099602
PCT Pub. Date: Jul. 2, 2015

(65) Prior Publication Data
US 2017/0001620 A1    Jan. 5, 2017

(30) Foreign Application Priority Data

Dec. 23, 2013   (SE) ...................................... 1351574

(51) Int. Cl.
*B60W 10/06*  (2006.01)
*B60K 6/365*  (2007.10)
(Continued)

(52) U.S. Cl.
CPC .............. *B60W 20/00* (2013.01); *B60K 1/02* (2013.01); *B60K 6/365* (2013.01); *B60K 6/387* (2013.01);
(Continued)

(58) Field of Classification Search
CPC ................. B60W 20/20; B60W 30/18; B60W 30/18027; B60W 30/181; B60W 10/02;
(Continued)

(56) References Cited

U.S. PATENT DOCUMENTS

| 5,433,282 A | 7/1995 | Moroto et al. |
| 5,492,189 A | 2/1996 | Kriegler et al. |

(Continued)

FOREIGN PATENT DOCUMENTS

| DE | 19628000 A1 | 1/1997 |
| DE | 19838853 A1 | 3/1999 |

(Continued)

OTHER PUBLICATIONS

Written Opinion of the International Search Authority for PCT/SE14/051573 dated Apr. 24, 2015.

(Continued)

*Primary Examiner* — Ramya P Burgess
*Assistant Examiner* — Lillian T Nguyen
(74) *Attorney, Agent, or Firm* — Moore & Van Allen PLLC; W. Kevin Ransom (57) ABSTRACT

A drive system for a vehicle comprises two electrical machines arranged between a combustion engine and an input shaft to a gearbox. The first machine's rotor and the input shaft of the gearbox are each connected to a separate component of a planetary gear. The second electrical machine's rotor is connected with the output shaft of the combustion engine, which is connected with another component of the planetary gear. A first locking means may be moved between a locked position, in which the planetary gear's three components rotate at the same rotational speed, and a release position, allowing for different rotational speeds. A second locking means is moveable between a locked position, in which the output shaft of the combustion (Continued)

engine is locked together with the second machine's rotor and a release position, in which the combustion engine's output shaft is disconnected from the second machine's rotor.

10 Claims, 2 Drawing Sheets

(51) Int. Cl.
| | |
|---|---|
| B60W 30/18 | (2012.01) |
| B60W 20/00 | (2016.01) |
| B60K 1/02 | (2006.01) |
| B60K 6/387 | (2007.10) |
| B60K 6/40 | (2007.10) |
| B60W 10/02 | (2006.01) |
| B60W 10/08 | (2006.01) |
| B60W 20/20 | (2016.01) |
| B60K 6/46 | (2007.10) |
| B60W 10/115 | (2012.01) |
| B60W 20/40 | (2016.01) |
| B60W 20/15 | (2016.01) |
| F16H 3/72 | (2006.01) |
| F02D 41/06 | (2006.01) |
| F02D 41/26 | (2006.01) |
| F02D 41/30 | (2006.01) |
| B60K 6/44 | (2007.10) |
| B60W 20/30 | (2016.01) |
| F02D 41/04 | (2006.01) |
| B60W 10/12 | (2012.01) |
| B60W 20/10 | (2016.01) |
| B60K 6/445 | (2007.10) |
| B60K 6/48 | (2007.10) |
| B60K 17/02 | (2006.01) |
| B60W 30/188 | (2012.01) |
| B60K 6/547 | (2007.10) |
| B60W 10/10 | (2012.01) |

(52) U.S. Cl.
CPC ............... B60K 6/40 (2013.01); B60K 6/44 (2013.01); B60K 6/445 (2013.01); B60K 6/46 (2013.01); B60K 6/48 (2013.01); B60K 17/02 (2013.01); B60W 10/02 (2013.01); B60W 10/06 (2013.01); B60W 10/08 (2013.01); B60W 10/115 (2013.01); B60W 10/12 (2013.01); B60W 20/10 (2013.01); B60W 20/15 (2016.01); B60W 20/20 (2013.01); B60W 20/30 (2013.01); B60W 20/40 (2013.01); B60W 30/18 (2013.01); B60W 30/181 (2013.01); B60W 30/18027 (2013.01); B60W 30/1886 (2013.01); B60W 30/18109 (2013.01); F02D 41/042 (2013.01); F02D 41/062 (2013.01); F02D 41/26 (2013.01); F02D 41/3005 (2013.01); F16H 3/728 (2013.01); B60K 6/547 (2013.01); B60W 10/10 (2013.01); B60W 30/18009 (2013.01); B60W 2400/00 (2013.01); B60W 2510/125 (2013.01); B60W 2520/40 (2013.01); B60W 2710/021 (2013.01); B60W 2710/06 (2013.01); B60W 2710/0644 (2013.01); B60W 2710/081 (2013.01); B60W 2710/083 (2013.01); B60W 2710/105 (2013.01); B60W 2710/1038 (2013.01); B60W 2710/125 (2013.01); B60W 2710/248 (2013.01); B60W 2710/30 (2013.01); B60W 2710/305 (2013.01); B60W 2720/40 (2013.01); B60Y 2200/92 (2013.01); B60Y 2300/18 (2013.01); B60Y 2300/188 (2013.01); B60Y 2300/18025 (2013.01); B60Y 2300/18091 (2013.01); B60Y 2300/19 (2013.01); B60Y 2300/43 (2013.01); B60Y 2300/60 (2013.01); B60Y 2300/78 (2013.01); B60Y 2300/84 (2013.01); B60Y 2400/73 (2013.01); Y02T 10/6221 (2013.01); Y02T 10/6286 (2013.01); Y02T 10/6239 (2013.01); Y02T 10/6286 (2013.01); Y10S 903/903 (2013.01); Y10S 903/91 (2013.01); Y10S 903/93 (2013.01); Y10S 903/945 (2013.01)

(58) Field of Classification Search
CPC ............... B60W 10/06; Y10S 903/903; B60Y 2300/18025; B60Y 2300/18091; B60Y 2300/18; B60K 6/365; B60K 6/387; B60K 6/40
See application file for complete search history.

(56) References Cited

U.S. PATENT DOCUMENTS

| | | |
|---|---|---|
| 5,508,574 A | 4/1996 | Vlock |
| 6,018,198 A | 1/2000 | Tsuzuki et al. |
| 6,083,138 A | 7/2000 | Aoyama et al. |
| 6,354,974 B1 | 3/2002 | Kozarekar |
| 6,579,201 B2 | 6/2003 | Bowen |
| 7,237,634 B2 | 7/2007 | Severinsky et al. |
| 7,282,008 B2 | 10/2007 | Oshidari |
| 8,182,391 B2 | 5/2012 | Klemen et al. |
| 8,403,807 B2 | 3/2013 | Tabata et al. |
| 8,500,589 B2 | 8/2013 | Ortmann et al. |
| 8,840,502 B2 | 9/2014 | Bergquist |
| 8,905,892 B1 | 12/2014 | Lee et al. |
| 9,139,076 B2 | 9/2015 | Lee et al. |
| 9,266,418 B2 | 2/2016 | Lee et al. |
| 9,327,716 B2 | 5/2016 | Pettersson et al. |
| 9,441,708 B2 | 9/2016 | Kimes et al. |
| 9,592,821 B2 | 3/2017 | Pettersson et al. |
| 9,643,481 B2 | 5/2017 | Goleski et al. |
| 9,937,920 B2 | 4/2018 | Lindstrom et al. |
| 2005/0049100 A1 | 3/2005 | Ai et al. |
| 2007/0056784 A1 | 3/2007 | Joe et al. |
| 2007/0102209 A1 | 5/2007 | Doebereiner |
| 2008/0009380 A1 | 1/2008 | Iwanaka et al. |
| 2008/0081734 A1 | 4/2008 | Duffy et al. |
| 2008/0275625 A1 | 11/2008 | Snyder |
| 2008/0318728 A1 | 12/2008 | Soliman et al. |
| 2009/0075779 A1 | 3/2009 | Kumazaki et al. |
| 2009/0076694 A1 | 3/2009 | Tabata et al. |
| 2009/0145673 A1 | 6/2009 | Soliman et al. |
| 2010/0063660 A1 | 3/2010 | Uchida |
| 2010/0099532 A1 | 4/2010 | Cashen |
| 2012/0028757 A1 | 2/2012 | Kimura et al. |
| 2012/0197475 A1 | 8/2012 | Akutsu et al. |
| 2012/0244992 A1 | 9/2012 | Hisada et al. |
| 2012/0245774 A1 | 9/2012 | Takami et al. |
| 2013/0102429 A1 | 4/2013 | Kaltenbach et al. |
| 2013/0109530 A1 | 5/2013 | Kaltenbach et al. |
| 2013/0297134 A1 | 11/2013 | Saito et al. |
| 2013/0316865 A1 | 11/2013 | Engström et al. |
| 2014/0024490 A1 | 1/2014 | Bangura et al. |
| 2014/0051537 A1* | 2/2014 | Liu ............ F16H 3/72 475/5 |
| 2014/0243149 A1 | 8/2014 | Holmes et al. |
| 2015/0149012 A1 | 5/2015 | Pettersson et al. |
| 2015/0239459 A1 | 8/2015 | Pettersson et al. |
| 2015/0375734 A1 | 12/2015 | Pettersson et al. |
| 2016/0052381 A1 | 2/2016 | Kaltenbach et al. |
| 2016/0159344 A1 | 6/2016 | Hata et al. |
| 2016/0176396 A1 | 6/2016 | Hata et al. |
| 2016/0288784 A1 | 10/2016 | Teraya et al. |
| 2017/0001622 A1 | 1/2017 | Lindstrom et al. |
| 2017/0001634 A1* | 1/2017 | Lindstrom ............ B60K 1/02 |

(56) References Cited

U.S. PATENT DOCUMENTS

| | | | |
|---|---|---|---|
| 2017/0043763 A1 | 2/2017 | Ketti-Cherif et al. | |
| 2017/0144649 A1* | 5/2017 | Bangura | B60W 20/13 |
| 2017/0282702 A1* | 10/2017 | Kim | B60K 6/445 |

FOREIGN PATENT DOCUMENTS

| | | |
|---|---|---|
| DE | 19841829 A1 | 3/2000 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 19838853 B4 | 11/2013 |
| EP | 552140 A1 | 7/1993 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| EP | 2832356 A1 | 2/2015 |
| FR | 2781727 A1 | 2/2000 |
| FR | 2832356 A1 | 5/2003 |
| GB | 2450410 A | 12/2008 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2007147732 A1 | 12/2007 |
| WO | 2008016357 A2 | 2/2008 |
| WO | 2011070390 A1 | 6/2011 |
| WO | 2012091659 A1 | 7/2012 |
| WO | 2013002707 A1 | 1/2013 |
| WO | 2013140546 A1 | 9/2013 |
| WO | 2013145089 A1 | 10/2013 |
| WO | 2013145101 A1 | 10/2013 |

OTHER PUBLICATIONS

International Search Report for PCT/SE2014/051573 dated Apr. 23, 2015.
European Search Report from the European Patent Office for PCT/SE2014/051573 dated Sep. 20, 2017.
International Preliminary Report on Patentability for PCT/SE2014/051573 dated Apr. 23, 2015.

* cited by examiner

TRACTION SYSTEM FOR A VEHICLE

CROSS-REFERENCE TO RELATED APPLICATION

This application is a national stage application (filed under 35 § U.S.C. 371) of PCT/SE2014/051573, filed Dec. 23, 2014 of the same title, which, in turn, claims priority to Swedish Application No. 1351574-7, filed Dec. 23, 2013; the contents of each of which are hereby incorporated by reference.

FIELD OF THE INVENTION

The present invention relates to a drive system for a vehicle according to a drive system for a vehicle and is particularly, but not exclusively, focused on such a drive system in motor vehicles in the form of wheeled commercial vehicles, especially heavy goods vehicles such as trucks and buses. The invention thus relates to a drive system for driving a hybrid vehicle which, generally, is a vehicle that may be powered by a primary engine, in this case a combustion engine, and a secondary engine, in this case an electrical machine. The vehicle is suitably equipped with means for storage of energy, such as a battery or a capacitor for storage of electric energy, and control equipment to control the flow of electric energy between the means and the electrical machine. The electrical machine may thus alternately operate as an engine or as a generator, depending on the vehicle's operating mode. When the vehicle decelerates, the electrical machine generates electric energy that may be stored, and the stored electric energy is used later for e.g. operation of the vehicle.

BACKGROUND OF THE INVENTION

Using a conventional clutch mechanism which disconnects the gearbox's input shaft from the combustion engine during a shifting process in the gearbox entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and the disadvantages associated therewith may be avoided. A vehicle with a drive system of this type constitutes prior art as set out in EP 1 319 546 and SE 536 329.

Although this drive system, especially the one described in SE 536 329, functions well and has a range of advantageous features, efforts are constantly made to improve such a drive system with respect to its behavior and function in certain operating situations.

SUMMARY OF THE INVENTION

The objective of the present invention is to show a drive system of the type defined above, which is in line with the above-mentioned efforts. This objective is achieved according to the invention, by providing a drive system with a second electrical machine and a second locking means.

By equipping the drive system with a second electrical machine and said second locking means, an improved behavior is obtained in a range of operational situations compared to such prior art drive systems. Specifically, when braking the vehicle it becomes possible to have the first locking means in a release position, without being limited by the reaction torque with which the combustion engine may resist. It also becomes possible to start the combustion engine when the torque is transmitted through the powertrain, i.e. out of the gearbox. When the vehicle is at a standstill, it also becomes possible to move off while maintaining a power balance, i.e. while supplying an energy storage means, such as a battery, and other electrical loads present in the vehicle, with a controlled current/power while a desired torque is maintained in the powertrain. Under most circumstances this is not achievable in prior art drive systems of this type.

According to one embodiment of the invention, said second locking means are adapted to, in said release position, separate a first part of the combustion engine's output shaft, arranged nearest the combustion engine, from a second part thereof, connected with said first component of the planetary gear, and the second electrical machine's rotor is connected with said part.

According to one embodiment of the invention, the output shaft of the combustion engine, the first electrical machine's rotor, the second electrical machine's rotor and the input shaft of the gearbox are rotatably arranged around a common rotation axis.

According to another embodiment of the invention, the planetary gear's sun wheel constitutes said first component and the ring gear constitutes said third component. By connecting the first electrical machine's rotor with the ring gear and the combustion engine's output shaft with the sun wheel, a compact construction is achieved, which is easy to fit into already existing spaces for powertrains (drive systems) with clutch mechanisms instead of planetary gears. Accordingly, a hybrid gearbox may be made compact and substantially no bulkier than a standard gearbox. This entails that the weight increase, which a hybridization normally involves, may be reduced considerably. Another advantage is that a connection of the first electrical machine's rotor with the ring gear provides a higher potential braking torque via the rotor, than if this were connected with the sun wheel instead.

According to another embodiment of the invention, the drive system comprises at least one control device, adapted to control the fuel supply to the combustion engine, and to control exchange of electric power between the first and second electrical machine on the one hand, and an electric energy storage device, if such is present in the drive system, on the other hand. "Electrical energy storage means" as used in this document means an energy storage means with an electrical interface in relation to the first and second electrical machine of the drive system, but storage of energy does not have to be electrical. This entails that in addition to an electrical battery and capacitor, e.g. flywheels, other mechanical means and means for building up pressure, e.g. pneumatic or hydraulic means, may be considered. The control device is advantageously also adapted to control said locking means to be moved between said locked position and release position, and, in order to lock them together, to control the combustion engine and/or the first electrical machine and/or the second electrical machine, to achieve the same rotational speed in the parts to be locked together by the respective locking means, and, subsequently, to move the locking means to a locked position, and, in order to release them, to control the combustion engine and/or the first electrical machine and/or the second electrical machine, in order to achieve a torque balance between the parts to be released from each other and, subsequently, control the locking means to be moved to a release position. This way of moving the first locking means between the locked position and the release position entails that the driver of the vehicle, a cruise control or other torque controlling function in the vehicle, while the method is implemented, is free to determine and change the torque which is transmitted by the drive system to the vehicle's powertrain via the planetary gear's output shaft.

According to another embodiment of the invention, the control device is adapted to control, when the vehicle is driven with the combustion engine turned off, and with the second locking means in a release position for start of the combustion engine,
- the first locking means to be moved to the release position,
- the first electrical machine to achieve the requested torque transmitted to the input shaft of the gearbox,
- the second electrical machine towards and to zero engine speed,
- the second locking means to be moved to a locked position,
- the second electrical machine towards and to the combustion engine's idling engine speed, and
- injection of fuel into the combustion engine.

Since the combustion engine may be started in this way without the gear being disengaged from the gearbox, such a start may take place while maintaining forward momentum. Such an approach entails that the driver of the vehicle, a cruise control or other torque controlling function of the vehicle, during the performance of the method, is free to determine and change the torque transmitted to the vehicle's powertrain, via the planetary gear's output shaft.

According to another embodiment of the invention, the control device is adapted to control, when the vehicle is driven with the combustion engine running and with the second locking means in a locked position for turning off of the combustion engine, and transition to powering the vehicle with the electrical machines,
- the combustion engine and/or the first electrical machine and/or the second electrical machine to achieve a torque balance in the planetary gear,
- the first locking means to be moved to the release position,
- if the second locking means is in a release position, the second electrical machine and the combustion engine towards and to a synchronous rotational speed of the second electrical machine's rotor and the combustion engine's output shaft, and to move the second locking means to a locked position,
- cessation of injection of fuel into the combustion engine,
- the second electrical machine towards and until a standstill,
- the second locking means to be moved to the release position,
- the second electrical machine toward and to the engine speed of the gearbox's input shaft, and
- the first locking means to be moved to a locked position.

Accordingly, controlled stopping of the combustion engine is achieved, at which its engine speed may be controlled in such a manner that vibrations are avoided. Through such stopping of the combustion engine with the help of the second electrical machine, there is no risk of the combustion engine starting to pendulate or oscillate around a zero position before it stops, which could otherwise happen. Additionally, the entire momentum in the combustion engine is taken care of. Such an approach for reaching a stop entails that the driver of the vehicle, a cruise control or other torque controlling function of the vehicle is free, during the performance of the method, to determine and change the torque which is transmitted to the vehicle's powertrain via the planetary gear's output shaft. There is no need to disengage the gear.

According to another embodiment of the invention, the control unit is adapted to control, when the vehicle is at a standstill with the combustion engine running at idling speed, the first locking means is in a release position, and the second locking means is in a locked position for driving of the vehicle with power balance,
- the first electrical machine for delivery of a torque thereof, so that the requested torque is transmitted to the input shaft of the gearbox,
- the combustion engine towards and to its idling speed,
- the second electrical machine to deliver a torque, so that the desired power to the energy storage means comprised in the vehicle and the electrical load is achieved,
- in case the torque available in the combustion engine at idling speed is insufficient to counteract both the reaction torque from the first electrical machine and the torque applied from the second electrical machine, to increase the engine speed of the combustion engine in order to increase the torque available from the combustion engine, and
- the first locking means to be moved to a locked position, when the input shaft of the gearbox, the first electrical machine and the combustion engine's output shaft rotate with the same rotational speed.

As long as none of the combustion engine, the first electrical machine and the second electrical machine achieve their performance limits, both the desired torque and the desired electrical power may be achieved at such start of driving. If the torque available in the combustion engine is insufficient, the engine speed may be increased, or the power target may be abandoned. If the second electrical machine reaches its limit, the power target must be abandoned. Abandoning the power target entails that the electrical energy storage means must deliver a current to the first electrical machine and to electrical loads. This is usually possible, although not desirable. Initially, the rotor rotates backwards in the first electrical machine during the start, and generates power when a positive torque must be achieved. In some cases it may be difficult for a battery to receive the power generated, e.g. at low temperatures of the battery, but in such case this power may be consumed by the second electrical machine, by way of the latter delivering a torque that helps the combustion engine's output shaft to rotate.

According to another embodiment of the invention, the control unit is adapted to control, when the vehicle is driven with the combustion engine running, and the first and second locking means are in a locked position, when braking the vehicle towards stop,
- the desired braking torque to be distributed between the first and second electrical machines,
- when a certain value of the vehicle's speed is not met, the first and second electrical machine in such a way that torque balance is achieved in the planetary gear, at the same time as the total torque transmitted to the input shaft of the gearbox corresponds to the desired braking torque, the first locking means to be moved to the release position, the combustion engine towards and to idling speed, and ramping down of the total braking torque from the first and second electrical machine towards zero in connection with the vehicle stopping.

Since the desired braking torque is distributed between the first and the second electrical machines, and control of the first and second electrical machines is carried out in order to apply a total torque on the output shaft to the planetary gear, corresponding to the desired braking torque at least to a predetermined low speed limit, before the vehicle stops, the desired braking torque may usually be achieved without any requirement for shifting gears during the deceleration. Since gear shifting is avoided, no braking energy is lost due to torque from an electrical machine being ramped down to prepare for a gear shift.

The invention also relates to a computer program product, an electronic control device, and a motor vehicle.

Other advantageous features and advantages with the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
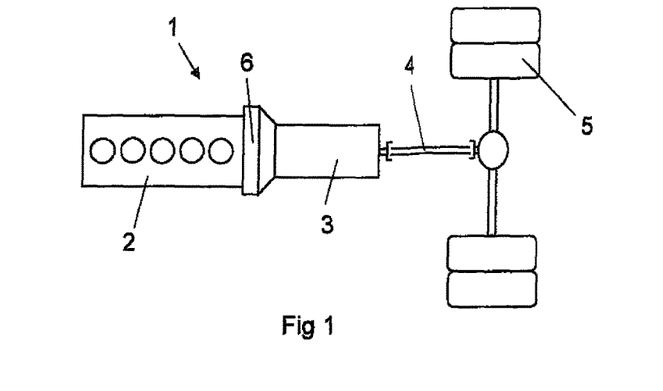
FIG. 1 is a very simplified view of a powertrain in a vehicle, which may be equipped with a drive system according to the invention.
Figure 2:
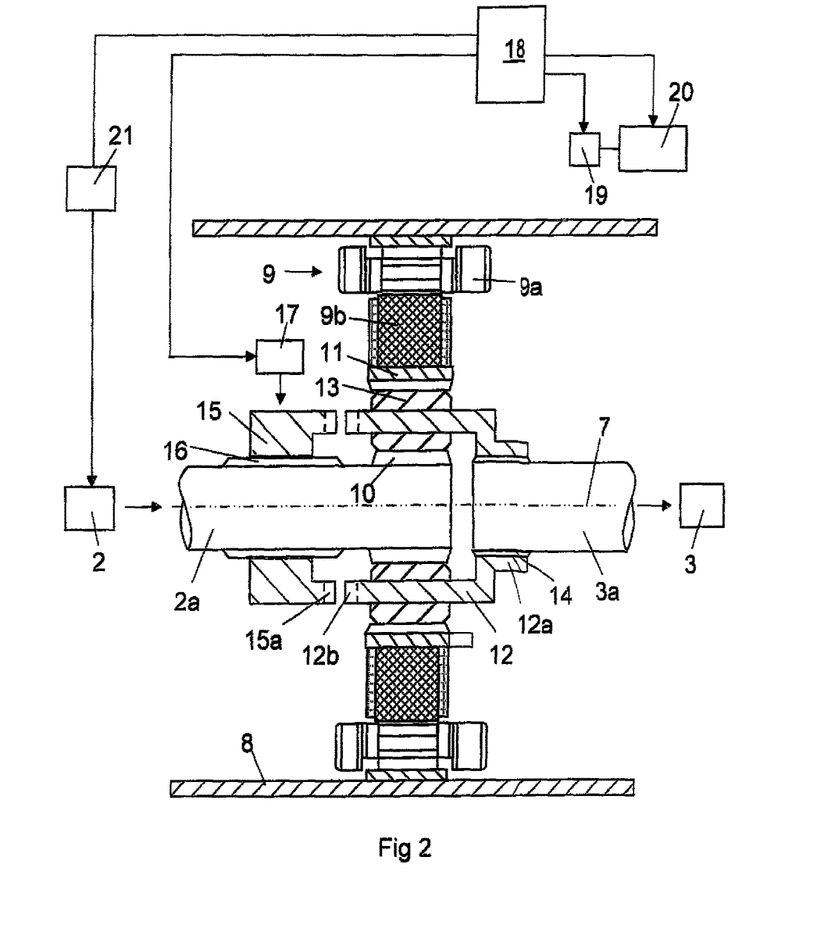
FIG. 2 is a more detailed, but still simplified view of a part of said drive system.

FIG. 1 shows a powertrain for a heavy goods vehicle 1. The powertrain comprises a combustion engine 2, a gearbox 3, a number of driving shafts 4 and driving wheels 5. Between the combustion engine 2 and the gearbox 3 the powertrain comprises an intermediate section 6. FIG. 2 shows a part of the components in the intermediate section 6 in more detail, more specifically those which also occur in prior art drive systems, such as the one according to SE536 329. The combustion engine 2 is equipped with an output shaft 2a, and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator-core which is fixed in a suitable manner on the inside of the house 8. The stator core comprises the stator's windings. The first electrical machine 9 is adapted, under certain operating circumstances, to use stored electrical energy to supply driving force to the input shaft 3a of the gearbox and under other operating conditions, to use the kinetic energy of the input shaft 3 of the gearbox to extract and store electric energy.

The planetary gear is arranged substantially radially inside of the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13 which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first rotational speed $n_1$. The planetary wheel carrier 12 comprises an attachment section 12a which is attached on a peripheral surface of the input shaft 3a of the gearbox with the help of a splines-joint 14. With the help of this joint, the planetary wheel carrier 12 and the gearbox's input shaft 3a may rotate as one unit with a second rotational speed $n_2$. The ring gear 11 comprises an external peripheral surface on which the rotor 9b is fixedly mounted. The rotor 9b and the ring gear 11 constitute one rotatable unit which rotates at a third rotational speed $n_3$.

The drive system comprises a first locking means since the combustion engine's output shaft 2a is equipped with a shiftable clutch element 15. The clutch element 15 is mounted on the combustion engine's output shaft 2a with the help of a splines-joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectable with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In such locked position the combustion engine's output shaft 2a and the gearbox's input shaft 3a will be locked together and accordingly these and the electrical machine's rotor will rotate at the same rotational speed. This state may be referred to as a locked planet. The locking mechanism may also advantageously have the design which is described in the Swedish patent SE 536 559, and comprise a sleeve equipped with first splines, which in the release position engage with second splines on a first component of the planetary gear, and in the locked position engage with third splines on a second component of the planetary gear. In this case, the first component is preferably the planetary wheel carrier, and the second component is the sun wheel. The locking mechanism may then be adapted like an annular sleeve, enclosing the planetary wheel carrier substantially concentrically. The locking means may also be made of a suitable type of friction clutch.

An electronic control device 18 is adapted to control the shifting element 17. The control device 18 is also adapted to determine the occasions on which the electrical machine should operate as an engine and the occasions on which it should operate as a generator. In order to so determine, the control device 18 may receive up to date information relating to suitable operating parameters. The control device 17 may be a computer device with a software suitable for this purpose. The control device 18 controls a schematically displayed control equipment 19, which controls the flow of electric power between an electric energy storage means in the form of a hybrid battery 20 and the stator windings 9a of the electrical machine. On occasions where the electrical machine 9 operates as an engine, stored electric energy is supplied from the hybrid battery 20 to the stator 9a. On occasions where the electrical machine operates as a generator, electric power is supplied from the stator 9a to the hybrid battery 20. The hybrid battery 20 delivers and stores electric energy with a voltage in the range of 300-900 Volt. Since the intermediate section 6 between the combustion engine 2 and the gearbox 3 in a vehicle is limited, the electrical machine 9 and the planetary gear must constitute a compact unit. The planetary gear's components 10, 11, 12 are arranged substantially radially inside the electrical machine's stator 9a. The rotor 9b of the electrical machine, the ring gear 11 of the planetary gear, the combustion engine's output shaft 2a, and the input shaft 3a of the gearbox, are here rotatably arranged around a common rotation axis 5. With such an embodiment, the electrical machine 9 and the planetary gear occupy a relatively small area. The vehicle 1 is equipped with an engine control function 21, with which the engine speed $n_1$ of the combustion engine 2 may be controlled. The control device 18 thus has the possibility of activating the engine control function 21 and of creating a substantially zero torque state in the gearbox 3 at engagement and disengagement of gears in the gearbox 3. The drive system may also, instead of being controlled by one single control device 18, be controlled by several different control devices.

The part of the drive system according to the invention described thus far, and displayed in FIG. 2, is present in the drive system according to SE 536 329. Below, the part of the drive system according to the invention, which has been added to this part, will be described with reference to FIG. 3.

Figure 3:
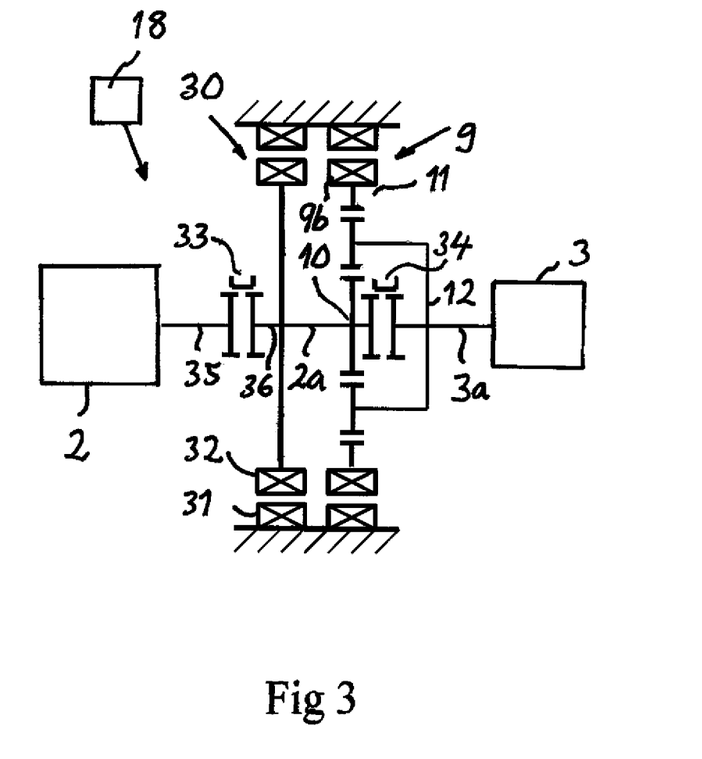
FIG. 3 is a simplified view, illustrating the general structure of a drive system according to one embodiment of the invention.

The drive system, specifically the intermediate section 6, according to the invention also has a second electrical machine 30, with a stator 31 with stator windings and a rotor 32 which is connected with the combustion engine's output shaft 2a. A second locking means 33, which may have a similar design as the first locking means 34, illustrated in more detail in FIG. 2, is adapted to separate, in a release position, a first part 35 of the combustion engine's output shaft, arranged nearest the combustion engine, from a second part 36 thereof connected with the sun wheel 10 of the planetary gear, so that the second electrical machine's rotor 32 and the sun wheel 10 are allowed to rotate independently of the first section 35 of the combustion engine's output shaft. The second locking means may be moved to a locked position in which both the parts 35, 36 of the combustion engine's output shaft are locked together, and accordingly the first part 35 is locked together with the second electrical machine's rotor. The control device 18 is adapted to control fuel supply to the combustion engine 2 and to control the exchange of electric energy between the first electrical machine 9 and the second electrical machine 30 on the one hand, and, on the other hand, electric energy storage means such as batteries.

A range of positive features are achieved in the drive system through the added arrangement of the electrical machine 30 and the second locking means 33. If the vehicle is driven with the first locking means 34 in a locked position, and for example the second locking means 33 in a locked position, and a request arises for moving the first locking means 34 into a release position, the drive system is controlled towards a torque balance between the components which are locked together, i.e. the planetary wheel carrier 12 and the sun wheel 10, via the first locking means 34. This may be achieved by controlling the first electrical machine 9, and at least one of the second electrical machine 30 and the combustion engine 2, since the second locking means 33 are in a locked position, towards said torque balance, so that there is also a possibility for energy storage in the hybrid battery 30 if desired. Here, torque balance is achieved when the following relation between the torques applied is met for the example configuration displayed in FIG. 3:

$$T_{sun\ wheel} = \frac{Z_s}{Z_r} T_{ring\ gear}$$

where
$T_{sun\ wheel}$ and $T_{ring\ gear}$ represent the torque applied to the sun wheel and the ring gear, respectively, where $T_{sun\ wheel} = T_{ice} + T_{em2}$ and $T_{ring\ gear} = T_{em1}$ where
$T_{ice}$ is torque applied to the combustion engine's output shaft
$T_{em2}$ is torque applied via the second electrical machine's stator to its rotor
$T_{em1}$ is torque applied via the first electrical machine's stator to its rotor,
$Z_s$ is the number of teeth on the sun wheel,
$Z_r$ is the number of teeth on the ring gear.

Accordingly, torque balance means the state where a torque acts on a ring gear arranged in the planetary gear, corresponding to the product of the torque acting on the planetary gear's planetary wheel carrier and the planetary gear's gear ratio, while simultaneously a torque acts on the planetary gear's sun wheel, corresponding to the product of the torque acting on the planetary wheel carrier and (1 minus the planetary gear's gear ratio). At such torque balance said first locking means 34 does not transfer any torque between the components of the planetary gear. Once torque balance has been achieved, the first locking means 34 may easily be moved to the release position, so that the planetary gear's components are no longer locked together.

A great advantage of a drive system according to FIG. 3 is the potential for continuous electric power supply of electrical units in all operating modes, with the combustion engine connected in a steady state. This is normally not achieved with hybrid solutions having only one electrical machine. When the first locking means is in a locked position, the said electric units are supplied by way of the requested electrical power to the electric auxiliary units, and the electric loads of the vehicle are distributed substantially equally between the electrical machines. In this way, the losses in the electrical machines are minimized since the torque per electrical machine is halved compared to where an electrical machine had supplied all the electrical power. Since the loss effects of the electrical machines substantially scale against the torque applied squared, this entails substantially a halving of the losses of the electrical machines. However, such a distribution (50/50) is potentially not optimal in case the two electrical machines have dimensions which differ considerably from each other, but efforts are still made to select said proportions with this optimal distribution in mind.

For example, the combustion engine 2 may be started when the vehicle is driven via electrical drive, without any torque in the powertrain disappearing, i.e. without any torque interruption, since such torque is achieved with the first electrical machine 9, while the second electrical machine may be controlled to zero rotational speed/a standstill, and the second locking means 33 may then be moved to the locking position and the second electrical machine may be controlled towards the combustion engine's idling speed. Likewise, when the vehicle is in operation with the combustion engine running, it may be turned off and stopped without any torque in the powertrain disappearing. The possibilities of achieving power balance are also considerably improved thanks to the addition of the second electrical machine and the second locking means, wherein at such power balance, the sum of the desired current to/from electrical energy storage devices and electrical loads may be both negative and positive. The term power balance relates to the fact that it is possible, within the general limitations specified for the drive system, to freely choose the charge current or discharge power from the energy storage device/hybrid battery. It is especially advantageous that it is possible to start driving the vehicle equipped with the drive system, even though the batteries of the vehicle, which constitute its electrical energy storage system, are very cold and may not receive any current. At the start of the vehicle, the first electrical machine 9 rotates backwards, and thus generates power when a positive torque must be achieved. The power generated may in such case not be received by the battery, but it may be consumed by the second electrical machine 30, since the latter applies a torque on the output shaft of the combustion engine, and helps to rotate such output shaft.

The advantages described above are achieved also at braking of a vehicle, which initially drives at e.g. a speed of approximately 50 km/h with the combustion engine running, since the drive system according to the invention has two electrical machines. Accordingly, usually torque balance may be reached in the planetary gear, without any reduction of the total braking torque being required. The same total braking torque may then be maintained when the first locking means is moved to the release position, i.e. the planetary gear is unlocked, and the combustion engine is controlled to its idling engine speed. Therefore, it is often advantageous to brake in one and the same gear all the way until the vehicle stops, which is facilitated in the drive system according to the invention.

Computer program code for implementation of a control unit in the drive system according to the invention is suitably included in a computer program which is loadable to the internal memory of a computer, such as the internal memory of an electronic control device 18 of a vehicle. Such a computer program is suitably provided via a computer program product, comprising a data storage medium readable by an electronic control unit, which data storage medium has the computer program stored thereon. Said data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

The invention is obviously not limited in any way to the embodiments described above, but numerous possible modifications thereof should be obvious to a person skilled in the area, without such person departing from the spirit of the invention as defined by the appended claims.

The first locking means may be adapted to lock together any two of said three components.

A transmission could be arranged between the rotor and the ring gear, and also between the combustion engine's output shaft and the sun wheel, such as upstream of the shaft which is displayed in FIG. 2 as connected with the sun wheel. The latter transmission could also consist of a variable gear.

It is also conceivable that the drive system has the ring gear as the first component and the sun wheel as the third component, even if the reverse would be preferable because of the advantages mentioned above.

The drive system according to the present application may, at least in some situations, also be advantageously used where no energy storage means/hybrid battery is comprised. In applicable situations, energy is then instead exchanged only between the first electrical machine and the second electrical machine. One example of an application of this method is the replacement of the function of a traditional coupling device (typically, a friction coupling) or a hydraulic torque converter, where such is normally exposed to high heat development and/or wear. Advantageously, a traditional friction coupling in a heavy tractor may, according to the present application, e.g. be replaced with a drive system that does not comprise any energy storage device/hybrid battery. Another example of an application where the drive system according to the present application may be used without comprising any energy storage means/hybrid battery is at the implementation of gear shift, when the drive system may be used to control/adjust/regulate the torque and/or engine speed of the input shaft of the gearbox, and/or of the output shaft/flywheel of the combustion engine, to carry out gear shifts in an advantageous manner. Energy is therefore exchanged only between the first electrical machine and the second electrical machine. It is a great strength that the power supply of the electrical aggregates may also take place, even if the vehicle is not equipped with an electrical energy storage means. The supply may also take place continuously during all types of up- and down-shifts, during crawling, moving off and braking. All driving modes except electrical driving and brake regeneration, may be carried out without any electrical storage means or with a defective energy storage means. In operating modes, with or without a defective electrical energy storage device, the voltage of the second electrical machine normally will be controlled to maintain the correct voltage level on the DC-link (supply voltage to the two inverters connected to the stators of the electrical machines). It is also conceivable that the voltage of the first electrical machine may be controlled in some cases. Voltage control is a "mode" of the inverter where a voltage is requested from the inverter. The inverter then controls the electrical machine's torque in such a way that the requested voltage is maintained on the inverter's supply voltage.

The structure of the drive system in the different embodiments defined in the claims are deemed to be evident, based on the specified features of the control unit. It is obvious to one skilled in the art that the various means which this is adapted to control may be realized in a number of ways, many of which a person skilled in the art will easily identify. Therefore it is neither suitable nor justified to specify any special design in the claims. For example, the first and second locking means may consist of the type of clutch element displayed in FIG. 2. Means for injection of fuel in the combustion engine may consist of any conceivable type of injector. Means for engine speed change and change of torque in the combustion engine may be the same, and achieve this by way of altered fuel injection. Means, such as engines or generators, to change the torque transmitted via the electrical machines and their engine speed, as well as the ways in which they act, consist of, for example, suitable power electronics and similar for control of inverters and other equipment, in a way that a person skilled in the art will realize without any problems. Means for measurement of the vehicle's speed consist of a suitable sensor where available, but could even be handled via GPS-signals.

The invention claimed is:

1. A drive system for a vehicle, wherein the drive system comprises:
   an output shaft in a combustion engine;
   an input shaft of a gearbox;

a first electrical machine comprising a stator and a rotor;
a planetary gear comprising three components in the form of a sun wheel, a ring gear and a planetary wheel carrier, wherein the output shaft of the combustion engine is connected to a first of said components in the planetary gear, so that a rotation of the output shaft leads to a rotation of such first of said components, wherein the input shaft of the gearbox is connected with a second of said components of the planetary gear, so that a rotation of the input shaft of the gear box leads to a rotation of such second of said components, and wherein the rotor of the first electrical machine is connected with a third of said components in the planetary gear, so that a rotation of the rotor of the first electrical machine leads to a rotation of such third of said components;
a first locking means, which may be moved between a locked position in which two of said components of the planetary gear are locked together, so that the three components of the planetary gear rotate with the same rotational speed, and a release position in which the components of the planetary gear are allowed to rotate at different rotational speeds;
a second electrical machine, with a stator and a rotor, connected to the combustion engine's output shaft between the combustion engine and said first of said components of the planetary gear;
a second locking means which may be moved between a locked position, in which the combustion engine's output shaft is locked to the second electrical machine's rotor and said first of said components of the planetary gear, and a release position, in which the output shaft of the combustion engine is disconnected from the second electrical machine's rotor and said first of said components of the planetary gear, and is allowed to rotate independently of the second electrical machine's rotor and said first of said components of the planetary gear; and
at least one control device, adapted to control fuel supply to the combustion engine and to control exchange of electrical power between the first electrical machine and the second electrical machine and/or between the first electrical machine and/or the second electrical machine and at least one electric energy storage device, if the at least one electric energy storage device is present in the drive system,
wherein the at least one control device is adapted to control said first and second locking means to be moved between the locked position and the release position and, wherein to move the first and second locking means to the lock position, said at least one control device controls the combustion engine, and/or the first electrical machine, and/or the second electrical machine to achieve the same rotational speed in the parts that are to be locked together by the respective first and second locking means, and, subsequently, to control the first and second locking means to be moved to the locked position, and, in order to move the first and second locking means to the release position, said at least one control device controls the combustion engine, and/or the first electrical machine, and/or the second electrical machine to achieve torque balance between the parts that are to be released from each other and, subsequently, to control the first and second locking means to be moved to the release position,
wherein when the vehicle is at a standstill with the combustion engine running at idling engine speed, the first locking means is in a release position, and the second locking means is in a locked position, in order to move the vehicle off with power balance the control device is further adapted to:
control the first electrical machine to delivery of a torque thereof, so that a requested torque is transmitted to the input shaft of the gearbox;
control the combustion engine towards and to its idling speed;
control the second electrical machine to deliver a torque, so that a desired power to an energy storage means and electrical loads comprised in the vehicle are achieved;
in case the torque available in the combustion engine at idling speed is insufficient to both counteract the reaction torque from the first electrical machine and the torque applied from the second electrical machine, control the combustion engine to increase the engine speed thereof, in order to increase the torque available from the combustion engine; and
control the first locking means to be moved to the locked position, when the input shaft of the gearbox, the rotor of the first electrical machine and the output shaft of the combustion engine rotate with the same rotational speed.

2. The drive system according to claim 1, wherein the second locking means are adapted to, in the release position, separate a first part of the output shaft of the combustion engine, arranged nearest the combustion engine, from a second part of the output shaft, connected with said first of said components of the planetary gear, and that the second electrical machine's rotor is connected with said second part of the output shaft.

3. The drive system according to claim 1, wherein the output shaft of the combustion engine, the rotor of the first electrical machine, the rotor of the second electrical machine, and the input shaft of the gearbox are rotatably arranged around a common rotation axis.

4. The drive system according to claim 1, wherein the sun wheel of the planetary gear is said first of said components and the ring gear of the planetary gear is said third component.

5. The drive system according to claim 1, wherein when the vehicle is driven with the combustion engine turned off and the second locking means is in the release position, for start of the combustion engine, the control device is adapted to control:
the first locking means to be moved to the release position;
the first electrical machine to achieve a requested torque transmitted to the input shaft of the gearbox;
the second electrical machine towards and to a standstill;
the second locking means to be moved to the locked position;
the second electrical machine towards and to the combustion engine's idling engine speed; and
injection of fuel into the combustion engine.

6. The drive system according to claim 1, wherein when the vehicle is driven with the combustion engine running, and with the first locking means in the locked position, in order to drive the vehicle powered by the electrical machines, the control device is adapted to control:
the combustion engine and/or the first electrical machine and/or the second electrical machine to achieve torque balance in the planetary gear;
the first locking means to be moved to the release position;

if the second locking means are in a release position, the second electrical machine and the combustion engine to a synchronous rotational speed of the second electrical machine's rotor and the combustion engine's output shaft, and to move the second locking means to the locked position;

cessation of injection of fuel into the combustion engine;

the second electrical machine towards and to a standstill;

the second locking means to be moved to the release position;

the second electrical machine towards and up to the engine speed of the gearbox's input shaft; and the first locking means to be moved to the locked position.

7. The drive system according to claim 1, wherein when the vehicle is driven with the combustion engine running, and with the first and second locking means in the locked position, at braking of the vehicle towards stop, the control device is adapted to control:

a desired braking torque to be distributed between the first and second electrical machines;

when a certain value of the vehicle's speed is not met, the first and second electrical machine, so that torque balance is achieved in the planetary gear, at the same time as a total torque transmitted to the input shaft of the gearbox corresponds to the desired braking torque;

the first locking means to be moved to the release position;

the combustion engine towards and to an idling speed; and ramping down of a total braking torque from the first and second electrical machine towards zero in connection with the vehicle stopping.

8. A computer program product to control a drive system for a vehicle, wherein the drive system comprises an output shaft in a combustion engine, an input shaft of a gearbox, a first electrical machine comprising a stator and a rotor, a planetary gear comprising three components in the form of a sun wheel, a ring gear and a planetary wheel carrier, wherein the output shaft of the combustion engine is connected to a first of said components in the planetary gear, so that a rotation of the output shaft leads to a rotation of such first of said components, wherein the input shaft of the gearbox is connected with a second of said components of the planetary gear, so that a rotation of the input shaft of the gear box leads to a rotation of such second of said components, and wherein the rotor of the first electrical machine is connected with a third of said components in the planetary gear, so that a rotation of the rotor of the first electrical machine leads to a rotation of such third of said components, wherein the drive system also comprises a first locking means, which may be moved between a locked position in which two of said components of the planetary gear are locked together, so that the three components of the planetary gear rotate with the same rotational speed, and a release position in which the components of the planetary gear are allowed to rotate at different rotational speeds, wherein the drive system comprises a second electrical machine, with a stator and a rotor, connected to the combustion engine's output shaft between the combustion engine and said first of said components of the planetary gear, and a second locking means which may be moved between a locked position, in which the combustion engine's output shaft is locked to the second electrical machine's rotor and said first of said components of the planetary gear, and a release position, in which the output shaft of the combustion engine is disconnected from the second electrical machine's rotor and said first of said components of the planetary gear, and is allowed to rotate independently of the second electrical machine's rotor and said first of said components of the planetary gear, and wherein the computer program product is stored in a non-transitory computer-readable medium and comprises computer-readable program code portions embodied therein, the computer-readable program code portions comprises computer code to cause one or more electronic processors to:

control fuel supply to the combustion engine and to control exchange of electrical power between the first electrical machine and the second electrical and/or between the first electrical machine and the second electrical machine and at least one electric energy storage device, if the at least one electric energy storage device is present in the drive system, control said first and second locking means to be moved between the locked position and the release position and, wherein to move the first and second locking means to the lock position, said at least one control device controls-the combustion engine, and/or the first electrical machine, and/or the second electrical machine to achieve the same rotational speed in the parts that are to be locked together by the respective first and second locking means, and, subsequently, to control the first and second locking means to be moved to the locked position, and, in order to move the first and second locking means to the release position, said at least one control device controls the combustion engine, and/or the first electrical machine, and/or the second electrical machine to achieve torque balance between the parts that are to be released from each other and, subsequently, to control the first and second locking means to be moved to the release position, wherein when the vehicle is at a standstill with the combustion engine running at idling engine speed, the first locking means is in a release position, and the second locking means is in a locked position, in order to move the vehicle off with power balance the control device is further adapted to:

control the first electrical machine to delivery of a torque thereof, so that a requested torque is transmitted to the input shaft of the gearbox;

control the combustion engine towards and to its idling speed;

control the second electrical machine to deliver a torque, so that a desired power to an energy storage means and electrical loads comprised in the vehicle are achieved;

in case the torque available in the combustion engine at idling speed is insufficient to both counteract the reaction torque from the first electrical machine and the torque applied from the second electrical machine, control the combustion engine to increase the engine speed thereof, in order to increase the torque available from the combustion engine; and control the first locking means to be moved to the locked position, when the input shaft of the gearbox, the rotor of the first electrical machine and the output shaft of the combustion engine rotate with the same rotational speed.

9. An electronic control device for control of a drive system for a motor vehicle, wherein the drive system comprises an output shaft in a combustion engine, an input shaft of a gearbox, a first electrical machine comprising a stator and a rotor, a planetary gear comprising three components in the form of a sun wheel, a ring gear and a planetary wheel carrier, wherein the output shaft of the combustion engine is connected to a first of said components in the planetary gear, so that a rotation of the output shaft leads to a rotation of such first of said components, wherein the input shaft of the gearbox is connected with a second of said components of the planetary gear, so that a rotation of the input shaft of the gear box leads to a rotation of such second of said components, and wherein the rotor of the first electrical machine is connected with a third of said components in the planetary gear, so that a rotation of the rotor of the first electrical machine leads to a rotation of such third of said components, wherein the drive system also comprises a first locking means, which may be moved between a locked position in which two of said components of the planetary gear are locked together, so that the three components of the planetary gear rotate with the same rotational speed, and a release position in which the components of the planetary gear are allowed to rotate at different rotational speeds, wherein the drive system comprises a second electrical machine, with a stator and a rotor, connected to the combustion engine's output shaft between the combustion engine and said first of said components of the planetary gear, and a second locking means which may be moved between a locked position, in which the combustion engine's output shaft is locked to the second electrical machine's rotor and said first of said components of the planetary gear, and a release position, in which the output shaft of the combustion engine is disconnected from the second electrical machine's rotor and said first of said components of the planetary gear, and is allowed to rotate independently of the second electrical machine's rotor and said first of said components of the planetary gear, and
wherein said electronic device comprises:
a storage device;
an electronic processor operatively coupled to the storage device; and
a computer program product stored in a non-transitory computer-readable medium on the storage device and comprising computer-readable program code portions embodied therein, the computer-readable program code portions comprises computer code to cause one or more electronic processors to:
control fuel supply to the combustion engine and to control exchange of electrical power between the first electrical machine and the second electrical machine and/or between the first electrical machine and the second electrical machine and at least one electric energy storage device, if the at least one electric energy storage device is present in the drive system,
control said first and second locking means to be moved between the locked position and the release position and, wherein to move the first and second locking means to the lock position, said at least one control device controls-the combustion engine, and/or the first electrical machine, and/or the second electrical machine to achieve the same rotational speed in the parts that are to be locked together by the respective first and second locking means, and, subsequently, to control the first and second locking means to be moved to the locked position, and, in order to move the first and second locking means to the release position, said at least one control device controls the combustion engine, and/or the first electrical machine, and/or the second electrical machine to achieve torque balance between the parts that are to be released from each other and, subsequently, to control the first and second locking means to be moved to the release position, wherein when the vehicle is at a standstill with the combustion engine running at idling engine speed, the first locking means is in a release position, and the second locking means is in a locked position, in order to move the vehicle off with power balance the control device is further adapted to:
control the first electrical machine to delivery of a torque thereof, so that a requested torque is transmitted to the input shaft of the gearbox;
control the combustion engine towards and to its idling speed;
control the second electrical machine to deliver a torque, so that a desired power to an energy storage means and electrical loads comprised in the vehicle are achieved;
in case the torque available in the combustion engine at idling speed is insufficient to both counteract the reaction torque from the first electrical machine and the torque applied from the second electrical machine, control the combustion engine to increase the engine speed thereof, in order to increase the torque available from the combustion engine; and
control the first locking means to be moved to the locked position, when the input shaft of the gearbox, the rotor of the first electrical machine and the output shaft of the combustion engine rotate with the same rotational speed.

10. A vehicle comprising a drive system,
wherein the drive system comprises an output shaft in a combustion engine, an input shaft of a gearbox, a first electrical machine comprising a stator and a rotor, a planetary gear comprising three components in the form of a sun wheel, a ring gear and a planetary wheel carrier, wherein the output shaft of the combustion engine is connected to a first of said components in the planetary gear, so that a rotation of the output shaft leads to a rotation of such first of said components, wherein the input shaft of the gearbox is connected with a second of said components of the planetary gear, so that a rotation of the input shaft of the gear box leads to a rotation of such second of said components, and wherein the rotor of the first electrical machine is connected with a third of said components in the planetary gear, so that a rotation of the rotor of the first electrical machine leads to a rotation of such third of said components, wherein the drive system also comprises a first locking means, which may be moved between a locked position in which two of said components of the planetary gear are locked together, so that the three components of the planetary gear rotate with the same rotational speed, and a release position in which the components of the planetary gear are allowed to rotate at different rotational speeds, wherein the drive system comprises a second electrical machine, with a stator and a rotor, connected to the combustion engine's output shaft between the combustion engine and said first of said components of the planetary gear, and a second locking means which may be moved between a locked position, in which the combustion engine's output shaft is locked to the second electrical machine's rotor and said first of said components of the planetary gear, and a release position, in which the output shaft of the combustion engine is disconnected from the second electrical machine's rotor and said first of said components of the planetary gear, and is allowed to rotate independently of the second electrical machine's rotor and said first of said components of the planetary gear, and wherein said vehicle comprises an electronic device comprising:

a storage device;

an electronic processor operatively coupled to the storage device; and a computer program product stored in a non-transitory computer-readable medium on the storage device and comprising computer-readable program code portions embodied therein, the computer-readable program code portions comprises computer code to cause one or more electronic processors to:

control fuel supply to the combustion engine and to control exchange of electrical power between the first electrical machine and the second electrical machine and/or between the first electrical machine and the second electrical machine and at least one electric energy storage device, if the at least one electric energy storage device is present in the drive system, control said first and second locking means to be moved between the locked position and the release position and, wherein to move the first and second locking means to the lock position, said at least one control device controls-the combustion engine, and/or the first electrical machine, and/or the second electrical machine to achieve the same rotational speed in the parts that are to be locked together by the respective first and second locking means, and, subsequently, to control the first and second locking means to be moved to the locked position, and, in order to move the first and second locking means to the release position, said at least one control device controls the combustion engine, and/or the first electrical machine, and/or the second electrical machine to achieve torque balance between the parts that are to be released from each other and, subsequently, to control the first and second locking means to be moved to the release position, wherein when the vehicle is at a standstill with the combustion engine running at idling engine speed, the first locking means is in a release position, and the second locking means is in a locked position, in order to move the vehicle off with power balance the control device is further adapted to:

control the first electrical machine to delivery of a torque thereof, so that a requested torque is transmitted to the input shaft of the gearbox;

control the combustion engine towards and to its idling speed;

control the second electrical machine to deliver a torque, so that a desired power to an energy storage means and electrical loads comprised in the vehicle are achieved;

in case the torque available in the combustion engine at idling speed is insufficient to both counteract the reaction torque from the first electrical machine and the torque applied from the second electrical machine, control the combustion engine to increase the engine speed thereof, in order to increase the torque available from the combustion engine; and control the first locking means to be moved to the locked position, when the input shaft of the gearbox, the rotor of the first electrical machine and the output shaft of the combustion engine rotate with the same rotational speed.

* * * * *